United States Patent [19]

Kawai

[11] Patent Number: 5,030,866

[45] Date of Patent: Jul. 9, 1991

[54] ELECTRIC MOTOR

[75] Inventor: Teruo Kawai, Tokyo, Japan

[73] Assignee: Kabushiki Kaisha Big, Ibaraki, Japan

[21] Appl. No.: 455,949

[22] Filed: Dec. 21, 1989

[30] Foreign Application Priority Data

Dec. 28, 1988 [JP] Japan .................. 63-329229

[51] Int. Cl.[5] .................. H02K 7/02; H02K 7/075
[52] U.S. Cl. .................. 310/82; 310/81
[58] Field of Search .................. 310/81, 82, 80

[56] References Cited

U.S. PATENT DOCUMENTS

| 2,579,865 | 12/1951 | Roters | 310/82 |
| 4,142,119 | 2/1979 | Madey | 310/82 |
| 4,728,837 | 3/1988 | Bhadra | 310/81 |

FOREIGN PATENT DOCUMENTS

| 197806 | 12/1976 | Fed. Rep. of Germany | 310/82 |
| 958312 | 11/1947 | France | 310/82 |

Primary Examiner—Steven L. Stephan
Assistant Examiner—Dennis R. Haszko
Attorney, Agent, or Firm—Flynn, Thiel, Boutell & Tanis

[57] ABSTRACT

An electric motor comprises a plurality of electromagnets arranged annularly in parallel, an electric switching circuit connected to each electromagnet, an iron cylinder arranged inside the electromagnets and having peripheral surface to be attracted partially arbitrarily by part of the electromagnets, a main axle positioned at the center of the iron cylinder and coaxially arranged with an axial core of the iron cylinder via bearings, and eccentric axles provided at both ends of the main axle so that the eccentric axles are arranged in accord with the center of the electromagnets to define a power generating axle.

9 Claims, 4 Drawing Sheets

ELECTRIC MOTOR

FIELD OF THE INVENTION

The present invention relates to an electric motor capable of effectively converting electric energy into mechanical energy by using a structure wherein the attraction and repulsion between a magnetic member and a magnet or magnets are intense where they are brought into contact with each other.

BACKGROUND OF THE INVENTION

A prior art electric motor for producing mechanical energy from electric energy is illustrated in FIG. 4. The electric motor comprises a rotary axle a, a commutator b and brushes c combined with the commutator b positioned around the rotary axle a, an armature d composed of an iron core and a coil wound around the iron core, and a pair of magnets e positioned outside the armature d whereby the armature d is turned by the attraction between the electromagnets to thereby produce the turning force or the mechanical force. The prior art electric motor has however the problem that, inasmuch as the direction of mutual induction between the armature d and the magnets e fixed outside the armature is circumferential, the inductance distance in the successive attractive and repellent movement effected during the operation of the electric motor, namely, the distance from the start of the mutual attraction between the fixed magnets e and the poles of the armature d to the point at which the attractive force therebetween is directed radially, cannot be smaller than the distance which is defined by dividing the circumferential length of the fixed magnets e by the number of switching poles produced by the armature d when rotated 360°, irrespective of whether a brush type or a non-contact type of motor is used.

In an inertia type motor, there is a shortcoming in that the inertia type motor is delayed in actuation thereof and much power is wasted because the inertia type motor cannot operate with its inherent capacity when energized until it arrives at a fixed speed of rotation.

SUMMARY OF THE INVENTION

The present invention has been made to solve the problems of the prior art electric motor.

It is therefore an object of the present invention to provide an electric motor capable of producing and taking off high effective turning energy or mechanical force from a predetermined input of electric energy and eliminating the delayed actuation thereof and the damages caused thereby.

To achieve the above object, the present invention comprises a plurality of electromagnets arranged annularly in parallel, an electric switching circuit connected to each electromagnet, an iron cylinder arranged inside the electromagnets and having a peripheral surface to be attracted partially arbitrarily by part of the electromagnets, a main axle positioned at the center of the iron cylinder and coaxially arranged with an axial core of the iron cylinder via bearings, and eccentric axles provided at both ends of the main axle so that the eccentric axles are arranged in accord with the center of the electromagnets to define a power generating axle.

The above and other objects, features and advantages of the present invention will become more apparent from the following description taken in conjunction with the accompanying drawings.

DESCRIPTION OF THE PREFERRED EMBODIMENT

Figure 2:
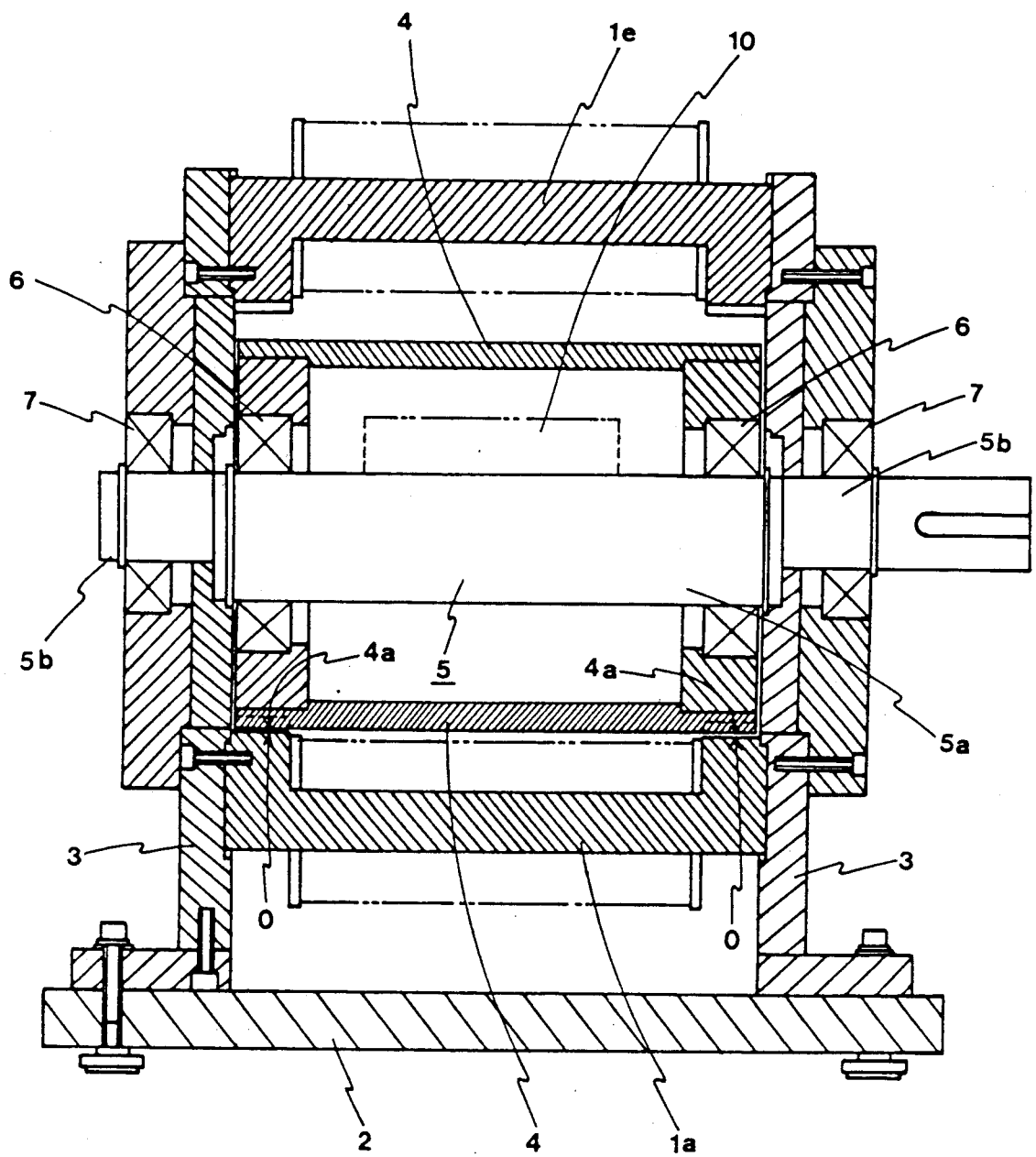
FIG. 2 is a cross-sectional view taken along line II—II of FIG. 1.
Figure 1:
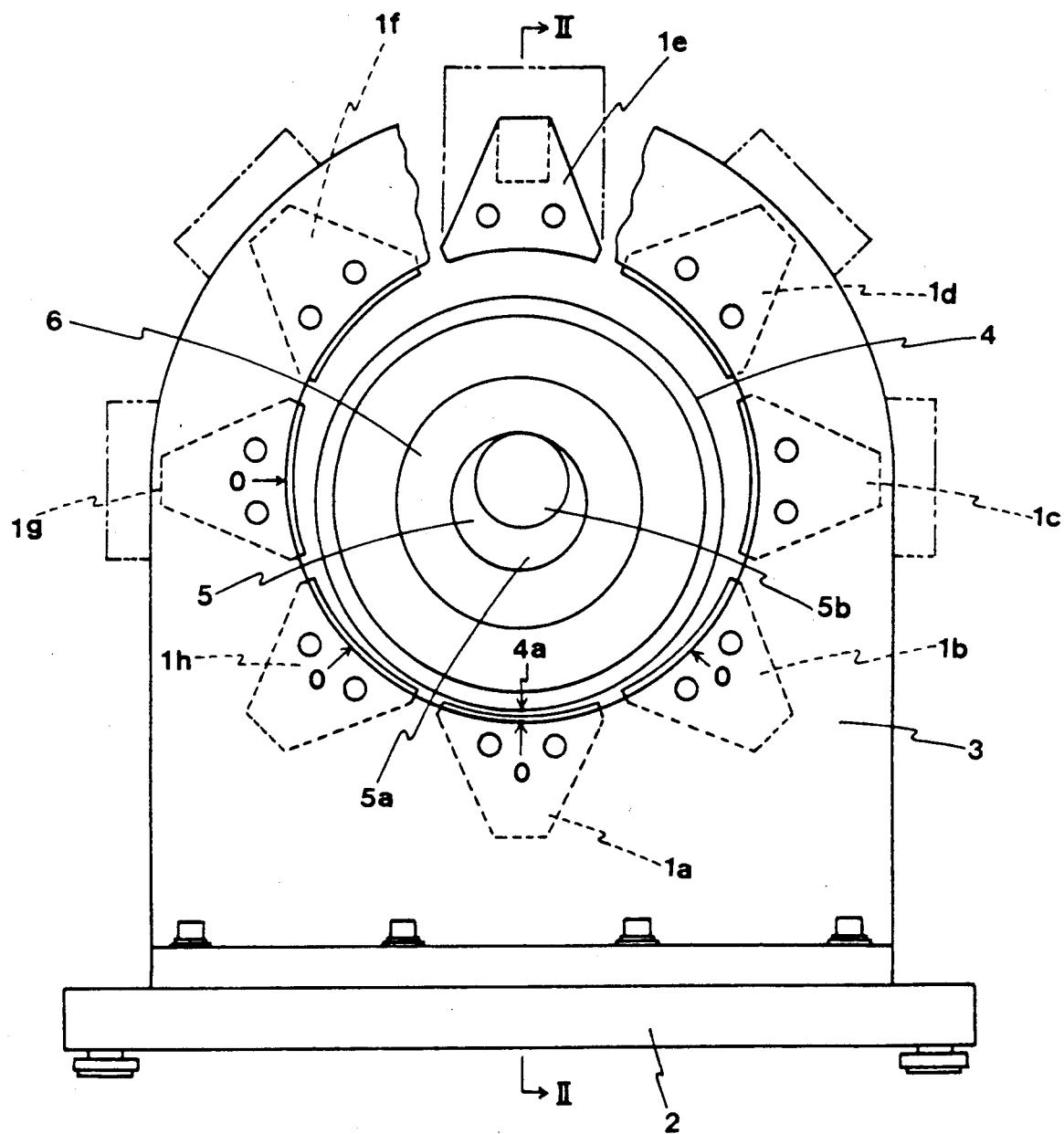
FIG. 1 is a partly cut-away front elevation showing an electric motor according to the present invention.
Figure 3:
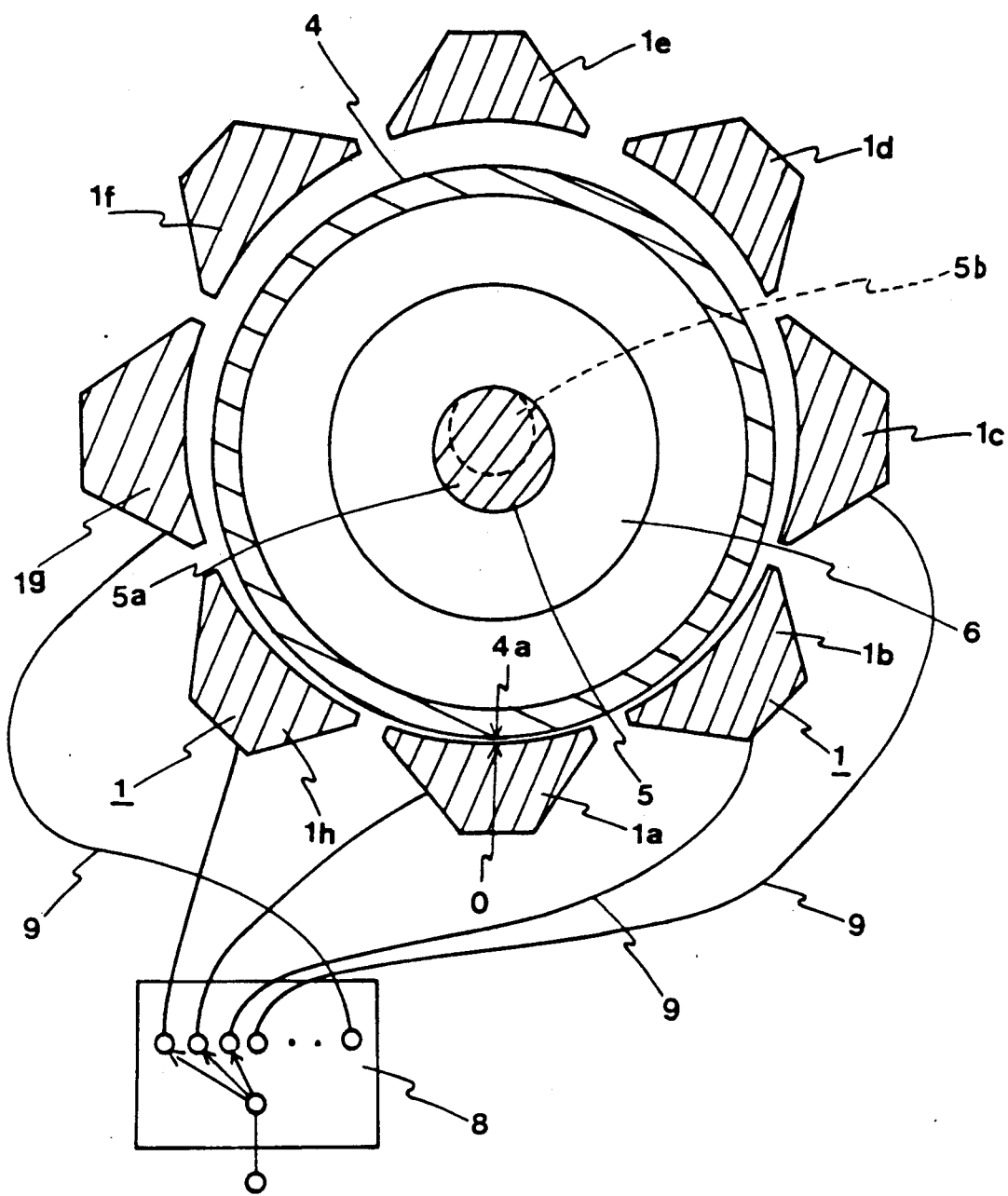
FIG. 3 is a view of assistance in explaining the operation of an electric switching circuit employed in the electric motor of the present invention.
Figure 4:
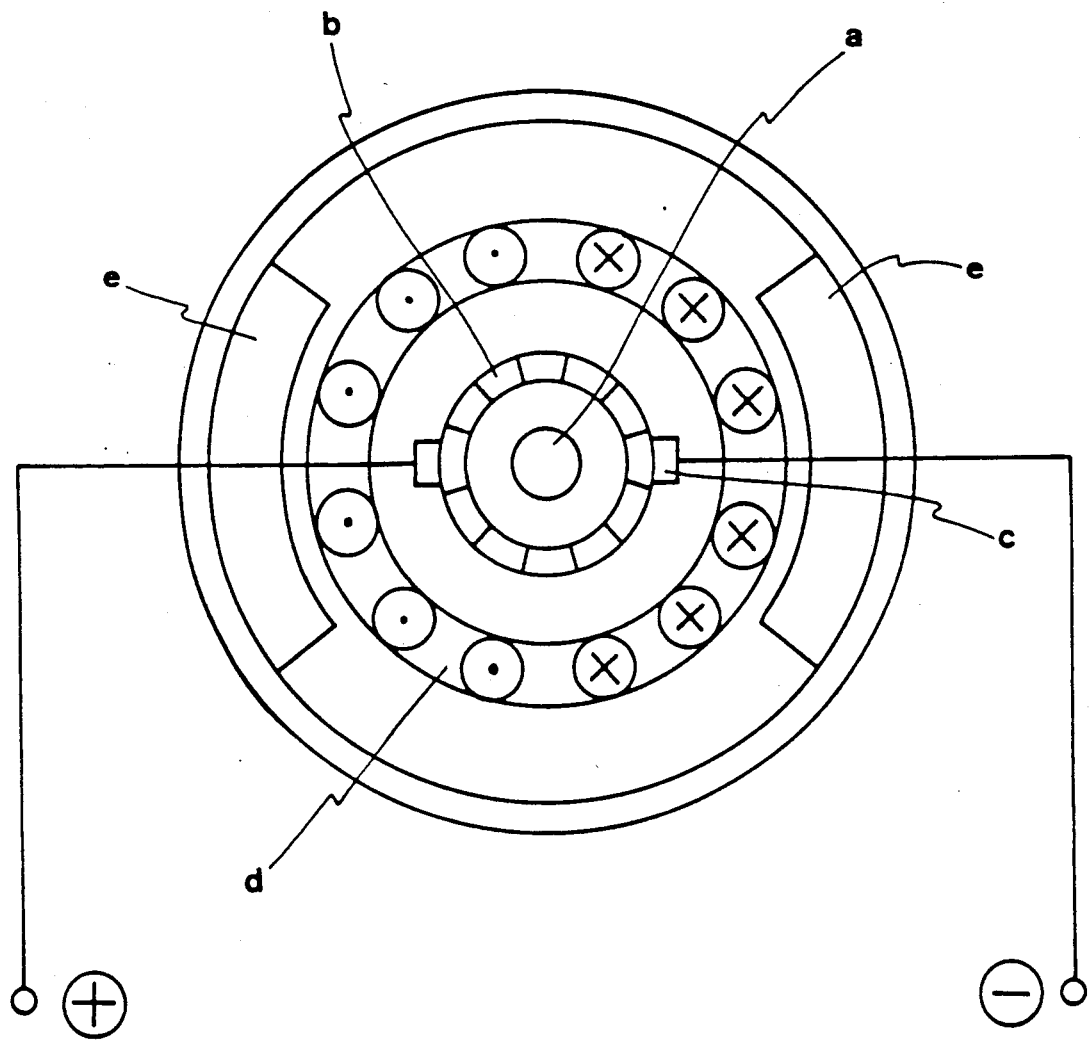
FIG. 4 illustrates a prior art electric motor.

An electric motor according to an embodiment of the present invention will be described with reference to FIGS. 1 to 3.

The electric motor comprises a plurality of electromagnets $1a$–$1h$ arranged annularly and in parallel relationship with each other, an electric current switching circuit 8 connected to each electromagnet, an iron cylinder 4 arranged inside the electromagnets and having a peripheral surface to be attracted partially arbitrarily by part of the electromagnets, a main axle $5a$ positioned coaxially at the center of the iron cylinder 4 via bearings 6 and 7, and eccentric axles $5b$ provided at both ends of the main axle $5a$ and arranged eccentrically relative thereto in accord with the center of the electromagnets $1a$–$1h$ to define a power generating axle.

More in detail, the electromagnets $1a$–$1h$ are annularly concentrically arranged and supported between supporting frames 3 which respectively oppositely project from a base 2. The number of electromagnets is eight according to the disclosed embodiment, but is not limited thereto. Generally, the greater the number of electromagnets, the smoother the turning movement of the motor. The iron cylinder 4 has an outer diameter slightly smaller than and eccentric relative to an inner diameter defined by the inner surfaces of the electromagnets. The axle 5 comprises the main axle $5a$ positioned in the center of the iron cylinder 4 and eccentric axles $5b$ having diameters less than that of the main axle $5a$ and provided at both ends of the main positioned coaxially, hence the main axle $5a$ operates as a crank pin and the eccentric axles $5b$ operate as crank shafts.

The electric motor having such an arrangement operates as follows.

When the electric current switching circuit 8 applies current to the electromagnets $1a$–$1h$ to successively energize them, the iron cylinder 4 is attracted in order successively by the electromagnets so that the iron cylinder 4 performs the turning movement or the rotary motion. Accordingly, the eccentric axles $5b$ form rotary axles whereby the mechanical force or power caused by the rotary motion is taken off from the eccentric axles $5b$. The attractive force is intensely generated at the portion of the iron cylinder $4a$ where the electromagnets $1a$–$1h$ and the iron cylinder 4 are brought into contact with each other. Immediately after the portion $4a$ of the iron cylinder 4 arrives at a center point 0 of the electromagnet $1a$, the electromagnet $1b$ is energized while the electromagnet $1a$ is de-energized at the same time. Immediately after the portion $4a$ of the iron cylinder 4 is attracted by the electromagnet $1b$ and arrives at the center point 0 of the electromagnet $1b$, the electromagnet $1c$ is energized while the electromagnet $1b$ is de-energized at the same time. The electromagnets 1d-1h are in order successively operated in the same manner.

The electric current switching circuit 8 can also apply current to the three electromagnets 1a, 1b, 1c so as to energize them simultaneously. In such case, immediately after the portion 4a of the iron cylinder 4 arrives at the center point 0 of the electromagnet 1a, the electromagnet 1d following the last energized electromagnet 1c is energized while the electromagnet 1a is de-energized at the same time. Immediately after the portion 4a of the iron cylinder 4 is attracted by the electromagnet 1b and arrives at the center point 0 of the electromagnet 1b, the electromagnet 1e is energized while the electromagnet 1b is de-energized at the same time. When such successive operations are repeated in order for the electromagnets 1f-1h, the iron cylinder 4 effects rotary motion.

With such repeated rotary motions, the turning force or the mechanical force is taken off from the eccentric axles 5b. However, inasmuch as the eccentric axles 5b are eccentric relative to the main axle 5a, the main axle 5a produces a centrifugal force when it is turned. Accordingly, once the main axle 5a starts to turn, the speed of rotation is increased satisfactorily. However, in the event that the main axle 5a does not turn smoothly from a static state, an adjustable weight 10 may be attached to the main axle 5a so that the main axle 5a can smoothly turn. Such adjustable weight 10 is shown by a chain line in FIG. 2.

As mentioned above in detail, the iron cylinder is successively attracted by the electromagnets when they are successively energized to thereby subject the iron cylinder to rotary motion. With successive rotary motion, mechanical force or power is generated and is taken off from the eccentric axles 5b provided at both sides of the main axle 5a. Thus, the rotary motion can be utilized as a drive source. Accordingly, inasmuch as the iron cylinder can be turned by the attractive force within the electromagnets, it is possible to take off a great power from the power axle, namely, from the eccentric axles, within a short period of time with a slight amount of electric power. Furthermore, the electric motor of the present invention is simple in structure and requires a small number of parts, and is thus very practical for manufacturing at low cost. In addition, the motor may be used with much less trouble than other known motors.

Although the invention has been described in its preferred form with a certain degree of particularity, it is to be understood that many variations and changes are possible in the invention without departing from the scope thereof.

What is claimed is:

1. An electric motor comprising:
a plurality of electromagnets arranged annularly around a central axis and in mutually parallel relationship;
an electric switching circuit means connected to each electromagnet for applying electric current in order successively to each electromagnetic to sequentially energize said electromagnets;
an iron cylinder arranged inside the electromagnets and having a peripheral surface, a portion of said peripheral surface being attracted by an attractive force caused by the electromagnets when energized;
a main axle positioned at the center of the iron cylinder coaxially relative thereto and eccentrically relative to said central axis, said main axle being supported by bearings in said iron cylinder for rotation relative to the iron cylinder; and
eccentric axles rigidly provided at both ends of the main axle and eccentrically relative thereto, the eccentric axles being arranged coaxially with the central axis of the electromagnets and supported for concentric rotation thereabout to define a power generating axle.

2. An electric motor according to claim 1, wherein the number of electromagnets is at least eight.

3. An electric motor according to claim 1, wherein the iron cylinder has an outer diameter slightly smaller than an inner diameter defined by inner surfaces of said electromagnets.

4. An electric motor according to claim 1, wherein each eccentric axle has a diameter which is less than that of the main axle.

5. An electric motor according to claim 1, wherein the electric current switching circuit means includes means for applying the current in order successively to respective groups of said electromagnets such that the electromagnets of the respective groups are energized at the same time.

6. An electric motor, comprising:
a pair of generally parallel support frames;
a plurality of electromagnets fixedly supported between said support frames and defining a generally concentric annular array surrounding a central axis;
an axle supported on and extending between said support frames, said axle including a main axle part extending between two end axle parts, said end axle parts being coaxial with each other and eccentric relative to said main axle part, said eccentric end axle parts being respectively rotatably supported on said support frames for rotation about said central axis of said electromagnets;
a cylindrical ferromagnetic core concentrically surrounding said main axle part, means for supporting said cylindrical core on said main axle part for concentric rotation relative thereto and eccentric rotation relative to said central axis of said electromagnets, said cylindrical core being closely eccentrically surrounded by said annular array of electromagnets, said cylindrical core always being in closely adjacent contactable relationship relative to one of said electromagnets; and
means for effecting eccentric rotation of said main axle part relative to said central axis and corresponding concentric rotation of said end axle parts relative to said central axis, including means for sequentially energizing said electromagnets in annular sequence to effect simultaneous concentric and eccentric rotation of said cylindrical ferromagnetic core relative to said main axle part and said central axis, respectively.

7. An electric motor according to claim 6, wherein said main axle part has a larger diameter than said end axle parts, said central axis passing through said main axle part.

8. An electric motor according to claim 7, including an adjustable weight attached to said main axle part.

9. An electric motor according to claim 6, wherein said sequential energizing means includes means operable during said rotation of said cylindrical core for de-energizing said one electromagnet while simultaneously energizing an adjacent said electromagnet.

* * * * *

UNITED STATES PATENT AND TRADEMARK OFFICE
CERTIFICATE OF CORRECTION

PATENT NO. : 5 030 866
DATED : July 9, 1991
INVENTOR(S) : Teruo Kawai

It is certified that error appears in the above-identified patent and that said Letters Patent is hereby corrected as shown below:

Column 4, line 46, delete "contactable".

Signed and Sealed this

Second Day of March, 1993

Attest:

STEPHEN G. KUNIN

Attesting Officer     Acting Commissioner of Patents and Trademarks